Nov. 10, 1970   K. R. DENNICK   3,539,887
INFINITELY VARIABLE REVERSIBLE ALTERNATING CURRENT DRIVE
Filed Feb. 27, 1969

INVENTOR.
Kenneth R. Dennick
BY
ATTORNEY

United States Patent Office 3,539,887
Patented Nov. 10, 1970

3,539,887
INFINITELY VARIABLE REVERSIBLE
ALTERNATING CURRENT DRIVE
Kenneth R. Dennick, 1161 York Ave.,
New York, N.Y. 10021
Continuation-in-part of application Ser. No. 709,855,
Feb. 9, 1968. This application Feb. 27, 1969, Ser.
No. 805,994
Int. Cl. H02p 5/46
U.S. Cl. 318—8                                    19 Claims

ABSTRACT OF THE DISCLOSURE

Two motors are arranged with their rotor and stator members disposed for independent rotation, and the normal operative speed and relative direction of rotation in each case still exists. A mechanical speed changer, utilizing a common drive such as a belt between two conical pulleys, such as the Reeves Drive, connects the two pulleys to the respective rotor elements of the two motors to establish desired relative speed rotation between the two rotors. The relative speeds of the two stator members are also thereby varied. Appropriate gearing is disposed between the two stator members, and is connected to an output shaft to derive the variable output speed.

---

This application is a continuation-in-part of my application Ser. No. 709,855, filed Feb. 9, 1968, and abandoned in favor of this application.

This invention relates to an infinitely variable and reversible alternating current drive. There are some applications in which it is desirable to change the direction of rotation of a load shaft and also to change the rate of rotation or speed in either direction.

A primary object of this invention is to provide speed-change mechanism that can be infinitely variably controlled to develop an output variable speed in either direction, although derived from two cooperating constant-speed electric motors whose rotors operate in the same fixed direction.

Another object of the invention is to provide a variable output speed in either direction from a first constant-speed motor, by using a second motor to control the rotational speed of the rotor of the first motor, and then utilizing the stator element of the first motor as a freely rotatable driving element to be connected to a drive shaft, so that the controlled speed of the rotor of the first motor can be used to control both the direction of rotation and the speed of rotation of the associated freely rotatably stator element of that first motor.

Another object of the invention is to provide an infinitely variable reversible alternating current drive, utilizing two alternating current motors each of which has a constant relative speed between its rotor and its stator, so arranged that one of the motors serves as a power output motor and the second motor serves as a power reaction device to share the load with said first motor, and serves also as a speed control device for said first motor.

Another object of the invention is to provide an infinitely variable reversible alternating current drive system, utilizing two constant-speed alternating current motors, whose respective rotor and stator members are supported for free and relative rotation, with means for controlling the relative speeds of the rotors of the two motors, in order thereby to control the direction of rotation and the relative speed of one of the stator members of one motor, with the stator of the second motor cooperating to help the first motor stator assume and carry the load on the output shaft from the first motor stator as a driving member.

The present invention utilizes two separate motors in which the two usual members of each of the two electric motors, namely, a rotor and a stator, are arranged and supported to be individually and relatively rotatable. The speed of each motor is preferably constant, although it need not be so. Any slight change in speed, as in an induction motor due to a change of slip, will be compensated for by the adjustment of the variable control member of the system.

In the case of a synchronous motor there will not be any slip to require compensation. Such lack of slip, or variation in slip, may, however, provide sufficient advantage in a specific application to justify the need of direct current to energize the field windings of the motor. In the case of the synchronous motor the rotating field, as a rotor, and the wound member that normally is stationary, as a stator, will both be supported for independent rotation. Thus, reference to the two members of an electric motor will apply to the members of an induction motor and also to the members of a synchronous motor. Reference is made to alternating current types of motors for convenience, not limitation.

In the basic arrangement, the distributed wound-stator winding may be designed for the specific line voltage that is available for the line at 220 volts. For flexibility and application to a 440 volt system, where the motor windings are designed for 220 volt operation, both terminals of the distributed phase windings of the rotor members are brought out to external slip rings on the rotatable external shaft structure of the stator member. The windings of both rotor members may then be coupled, with the corresponding phase windings connected in series to absorb the full voltage of the supply line, while still operating as a set of related motor windings at their normal design voltage. For operation at their normal design voltage of 220 volts, one set of slip rings may be short-circuited.

In another modification, two wound rotor motors are employed. The windings of the two stator members are connected directly to the supply line through their respective external slip rings, which permits free independent rotation of the stator members. The rotor windings are provided with slip rings, as is conventional with wound rotor motors, to permit the insertion of external variable resistance in circuit with the rotor windings for starting purposes.

In another modification, utilizing wound rotors, of the two motors the rotor windings may be connected in series with each other, with the corresponding phase windings appropriately connected, and with the series connection including an external variable resistance arrangement between the two set of slip rings of the two rotors, to provide mutual starting conditions for the two motors by varying the resistance values.

Another modification is the one utilizing synchronous motors, with the two stator windings connected directly to the supply lines, and the two field windings connected to the direct current supply line. In this modification both the rotor and the stator members are all provided with slip rings for connection to the external circuits.

The system is essentially a differential system in which, as here illustrated, in a first basic modification, the two stator members of the respective two motors are coupled through two gears so that the stator members tend to rotate in opposite directions. The two rotors of the two motors are coupled through a speed-change mechanism which can be varied and adjusted to change the ratios of the speeds of the two rotors in a ratio below 1:1, or above 1:1 or to hold the speed ratio at 1:1, while maintaining the total or sum of the two rotor speeds relatively constant.

In a motor, the speed of the motor is usually considered the speed of the rotor relative to the stator. In the usual case, the stator is fixed to a base which is anchored and the speed of the rotor is therefore the full or normal speed of the motor, as usually considered.

In the present system, the rotor and the normally-called stator member are both supported for independent rotation. Energy is supplied to the rotating stator member through suitable slip rings, all of which are mere details which need not be considered at this stage in discussing and considering the principle of operation.

Since both members are so supported for rotation, and the relative rotation between the rotor and the stator represents and corresponds to the normal speed of the motor, as determined by the motor design, a change in the speed of the rotor will cause a corresponding change in the speed of the stator.

Thus, the speed of either member, rotor member, or stator, may be controlled to cause a related change in speed of the other member.

In order to control the speed of the first rotor, and thus the relative speed of the stator member of the first motor, the second motor is utilized having a similar stator member and rotor member, both of which are independently rotatable. A change speed mechanism is connected between the two rotors. By appropriately varying the change speed mechanism, the individual speeds of the two rotors can be controlled to be at a certain ratio, as selected, while maintaining the total of the speeds of the two rotors constant.

Thus, by utilizing the speed change mechanism to vary the absolute speed of the rotor of the first motor, the reaction or relative speed of the stator member first can be controlled.

Further, by varying the ratio between rotor speeds, below 1:1 or above 1:1 in the speed changing mechanism, the relative speeds and directions of the stator members of the motors may be controlled in this system, through a range of speeds in either direction.

In order to establish a positive control on the stator member of the first motor, the stator member of the second motor is utilized so as to provide a reaction base, which serves several purposes; first, to provide a positive base to assure the rotation of the stator member in the desired direction; second, to prevent drift of the stator member of the first motor as an output or load motor when the speed change mechanism is disposed at the 1:1 ratio position; and third, to share the load with the first motor.

In a second basic modification of the invention, the two stator members of the respective two motors are coupled through said speed-change mechanism, to adjust the ratio of the speeds of those two stator members, to correspondingly vary the speeds of the associated rotors, for combination to derive an output speed. Corresponding features are then present in this second basic modification.

The manner in which the apparatus of the invention is constructed and operates is shown and explained in the following specification taken in connection with the accompanying drawings, in which.

Figure 1:
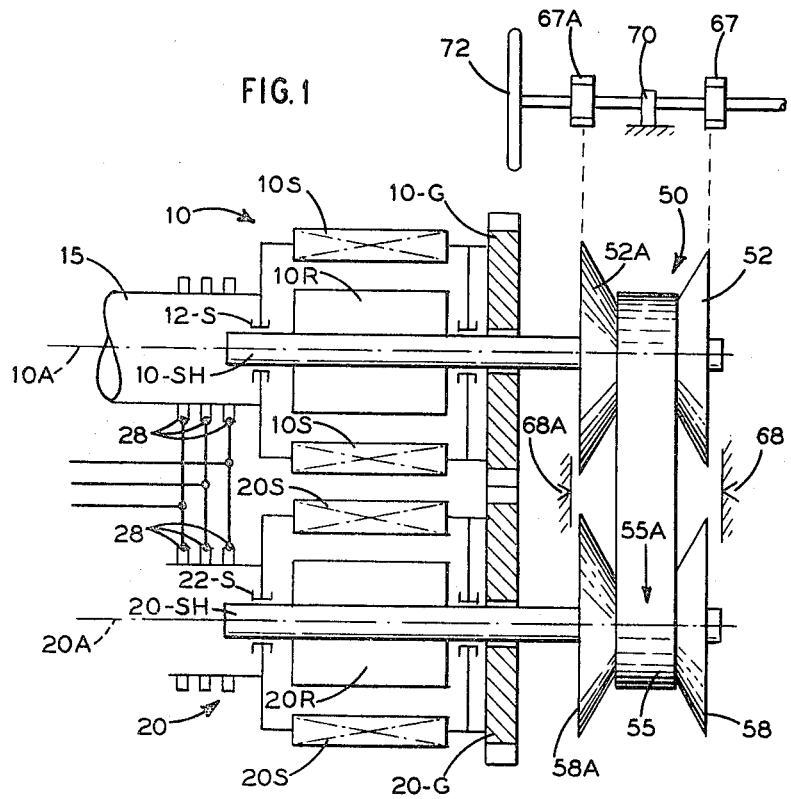
FIG. 1 is a functional, mechanical layout, in diagram, of a variable speed system embodying the invention, and shown as utilizing two motors cooperating through a speed change mechanism.
Figure 6:
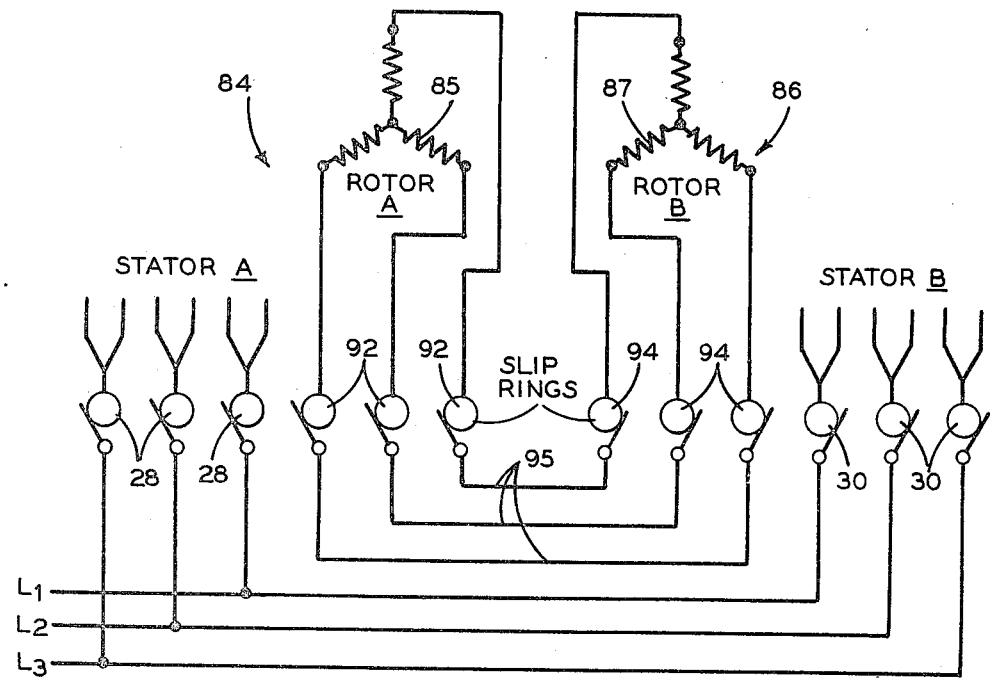
FIG. 6 is a schematic diagram showing a modified arrangement of the system in FIG. 1, but in which two wound-rotor motors are used, with slip rings on the respective rotor shafts.
Figure 7:
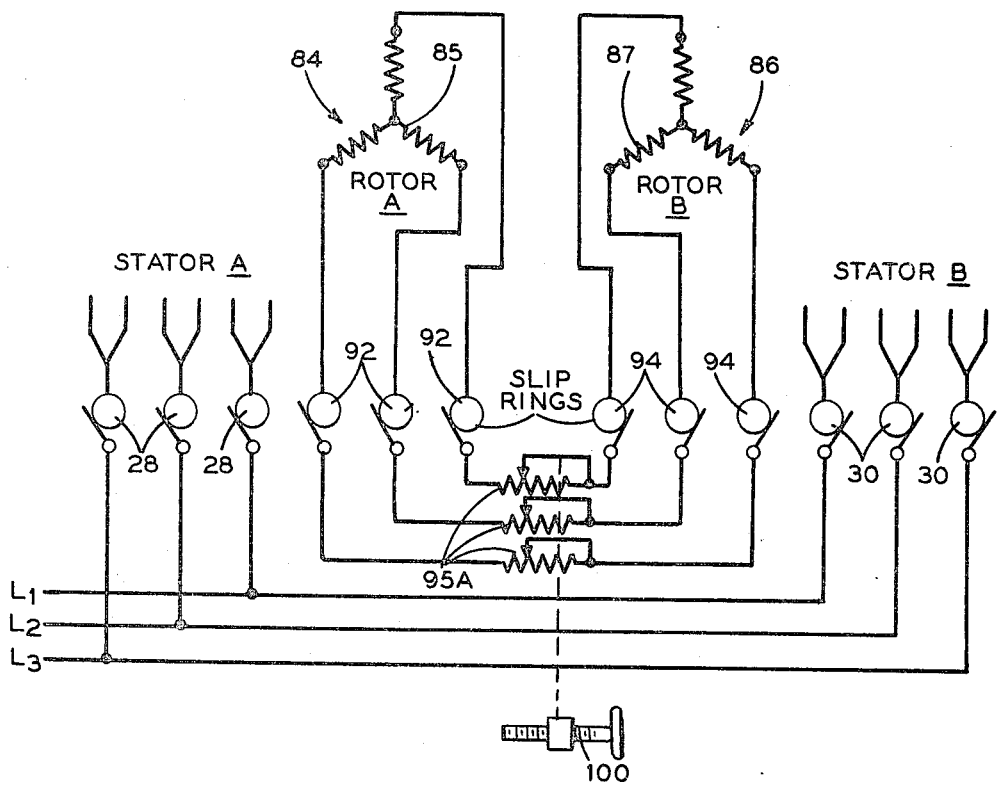
Figure 8:
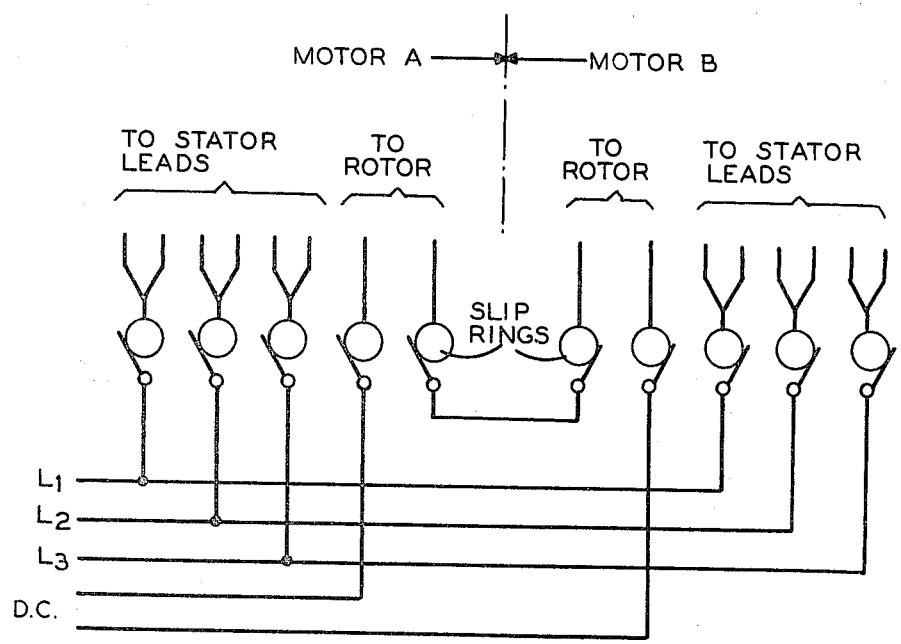
Figure 9:
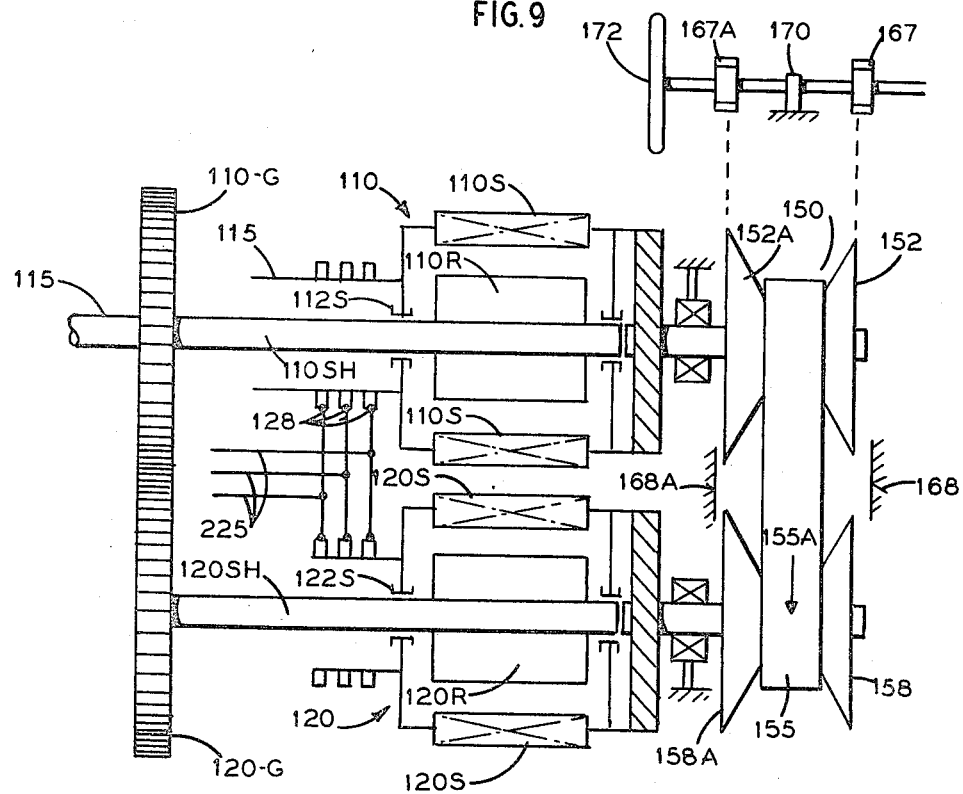

FIG. 7 is a schematic diagram of an arrangement similar to that in FIG. 6, but with the windings of the wound rotors connected in series, with common series variable resistance between the rotor windings for starting and regulation control; and FIG. 8 is a schematic diagram of an arrangement similar to FIG. 1, but in which synchronous motors are employed, and slip rings are provided for the field winding and also for the rotatable stator structures; and FIG. 9 is a view similar to FIG. 1, in which the speed-changing mechanism is coupled to the two stator members, instead of to the two rotors as shown in FIG. 1.

As shown in FIG. 1, the mechanism employed in a first modification of the system embodying this invention, comprises a first electric motor 10 comprising a rotor 10R and a stator 10S; and a second motor 20 comprising a rotor 20R and a stator 20S. Both motors 10 and 20 are of relatively constant speed and for the purpose of this explanation, are preferably of the same design characteristics.

The rotor 10R of the first motor 10 is supported on a shaft 10–Sh and the second motor 20 has its rotor 20R supported on a shaft 20–Sh.

The rotor 10R and the stator 10S are mounted to be independently rotatable. In the arrangement shown, the stator 10S serves as an output drive member and is connected to an output shaft 15 which may be connected to an external load. In a modified arrangement, as will be explained later, the rotor 10R may serve as the drive member, for connection to an external load.

Similarly, in the second motor, the shaft 20–Sh and the stator member 20S are supported to permit independent rotation of these two members.

The stator member 10S of the first motor is directly mechanically connected to a gear 10–G which is to be rotatable with the stator member 10S, concentrically about the axis 10A of the shaft 10–Sh of the first motor 10.

In similar manner, a gear 20–G is mechanically connected to the stator member 20S of the second motor 20 to be rotatable with the stator 20S relative to the shaft 20–Sh concentrically about the common axis 20–A of the shaft of the second motor 20.

The two gears 10–G and 20–G are similar and of the same size with respect to gear pitch and tooth numbers. Although the two gears are shown schematically here as being directly geared to each other and disposed for free rotation on the shafts of the respective motors, those gears may actually be similarly supported for free rotation on the shafts of the individual motors, but geared to each other through suitable gearing to accomplish the differential function herein described.

It will be clear that when the two rotors 10–R and 20–R are rotating at the same speed, they will be rotating in the same direction, and their respective related stator members will be torqued to tend to rotate at the same speed but in directions opposite to the directions of the rotors. However, the two gears 10–G and 20–G when geared as shown, are differentially effective, and if the two stator members tend to rotate in the same direction at the same speed, the two gears will remain stationary and will hold the two stator members also stationary.

For the purpose of the present invention, it is perferable that the two motors be similar and the moment of inertia of the two rotors and their respective mechanically related mechanism be substantially equal. It is also preferable that the moment of inertia of the rotor and its mechanically related mechanism in each motor be substantially equal to the moment of inertia of the stator member and its mechanically related mechanical parts.

Since the first motor 10 operates with the rotor rotating in one direction only, the driving speeds from the two stator members 10S and 20S to the related gears 10–G and 20–G, must be appropriately controlled to establish a desired output speed on the load shaft 15 connected to stator 10S, in the direction of rotation desired in that load shaft 15. To achieve such a speed control, a variable speed transmission 50 is utilized, to control the relative speeds of the two rotors 10R and 20R.

The variable speed transmission 50, shown schematically in its structural form, utilizes a construction that is conventional and commercially well known in the art. Its manner of application in this invention, however, is different.

In conventional use, the variable speed transmission 50 would be operated directly in sequential arrangement between a power source and the load. Here, however, the variable speed transmission 50 is used as a speed-ratio changer to change the speed ratio between the two shafts 10–S$h$ and 20–S$h$ of the two motors, while keeping the sum of the speeds of those two shafts 10–S$h$ and 20–S$h$ relatively constant. The manner in which the speed ratio changer is operated is illustrated functionally in FIGS. 2 and 3.

Figure 2:
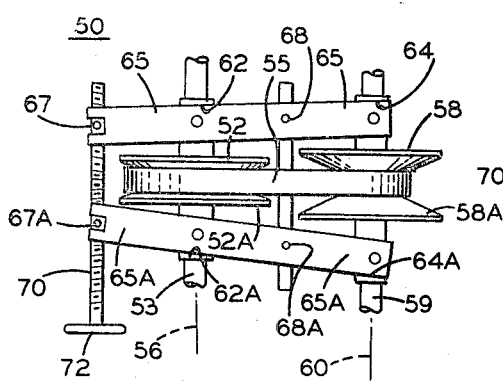
FIG. 2 is a schematic, mechanical arrangement showing the manner in which the speed-changing mechanism may be adjusted to establish a speed ratio in one ratio-direction, from an intermediate one-to-one position.

In FIG. 2 in shown a functional schematic arrangement of the various elements that enter into the construction and operation of the speed-ratio changer 50. As there shown, the speed-ratio changer 50 comprises a pair of radially grooved conical shaped wheels 52 and 52$a$, splined on a splined supporting shaft 53, so the two wheels 52 and 52$a$ may be moved in closer relationship, as indicated, or moved axially to predetermined maximum separation, to accommodate a linked belt 55 at different radial distances, on the conical wheels 52 and 52$a$, from the central axis 56 of the splined supporting shaft 53.

A second pair of similar conical wheels 58 and 58$a$ are similarly splined and supported on a splined shaft 59 to permit those two wheels 58 and 58$a$ to be axially moved toward, or away from, each other, to provide a supporting position for the belt 55 on those two wheels 58 and 58$a$, at different adjusted levels, representing different radial distances on the two wheels 58 and 58$a$ from the central axis 60 of the supporting splined shaft 59.

The arrangement of the two sets of radially grooved conical wheels 52 and 52$a$ and 58 and 58$a$, respectively, is such that, as one set of wheels is gradually adjusted from minimum spacing to a maximum spacing, the other pair of wheels will be inversely controlled from a maximum spacing to a minimum spacing.

In order to establish such inverse action, the wheels 52 and 52$a$ of one set are respectively supported on brackets 62 and 62$a$ that are coaxially supported for axial movement on the shaft 53. The wheels 58 and 58$a$ of the other set, are respectively supported on brackets 64 and 64$a$, those brackets being similarly supported for axial movement on shaft 59, on suitable bearings to permit independent rotation of the shaft 59 with its two supported wheels 58 and 58$a$.

A lever 65 pivotally joins the two brackets 62 and 64 for the two wheels 52 and 58, and extends backward to a threaded control bracket 67 which is arranged to be laterally and adjustably moved to control the position of the lever 65. The lever 65 is also pivoted on a pivot 68 so the pivot point 68 for the lever 65 will be intermediate and equidistant from the pivot points on the two brackets 62 and 64. Thus, lateral movement on the adjusting bracket 67 will move the pivoted lever 65 to cause the brackets 62 and 64, with their supported wheels 52 and 58, to be moved axially through equal distances, but in opposite directions, on their respective shafts 53 and 59.

A second pivoted lever 65$a$ is similarly pivotally connected between the two brackets 62$a$ and 64$a$, and the lever 65$a$ is pivotally supported on an intermediate pivot 68$a$. The lever 65$a$ extends out to a bracket 67$a$ which is suitably threaded and supported on a threaded rod 70 that is provided with a hand wheel 72, or other equivalent means, for turning the threaded rod 70 to adjustably shift the positions of the two threaded brackets 67 and 67$a$ to space those two pivoted brackets 67 and 67$a$ more closely together or farther apart, according to the speed ratio desired between the two sets of conical wheels 52 and 58.

Continuing in FIG. 2, when the two sets of wheels 52 and 52$a$, and 58 and 58$a$, are adjusted to their respective intermediate or neutral positions, and rotating power is supplied to either shaft 53 or 59, those two shafts 53 and 59 will rotate at the same speed. In that case, the power transmission belt 55 will be riding on the two sets of wheels at a radial level that will be of the same radius in both cases, and the two sets of wheels will therefore rotate at the same speed, and, of course, always in the same direction.

If, for example, in FIG. 2, the set of wheels 52 and 52$a$ were adjusted to minimum spacing and close position by the hand wheel control 72, the other set of wheels 58 and 58$a$ would be separated to maximum spacing, as indicated, and the two sets of wheels would rotate as a pair of related gears driven by the belt 55, according to the radial distance of the belt 55, in its riding position, from the axis of the related shaft 53 or 59. Thus, as in the arrangement of FIG. 2, rotation of either shaft 53 or 59 would cause the speed of wheels 52 and 52$a$ to be low and the speed of wheels 58 and 58$a$ to be high.

Figure 3:
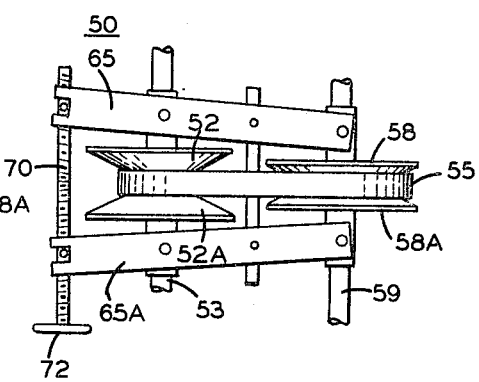
FIG. 3 is a view similar to FIG. 2 with the mechanism arranged to vary the speed ratio in the opposite ratio-direction, from the intermediate one-to-one position.

Assuming a possible speed-ratio change of six to one, with a shift from inner or low position of the belt to the outer high position of the belt, of the respective wheels, the speed-ratio could be changed from one to six in the arrangement shown in FIG. 2, to a ratio of six to one in an arrangement in which the wheels 52 and 52$a$ were moved to their maximum separation, and the wheels 58 and 58$a$ were moved to their minimum separation with close setting, as shown in FIG. 3.

The operation of this ratio-changing mechanism may now be considered in connection with FIG. 1, to observe how the change in the speed-ratio serves to control both the output speed and the direction of rotation imparted to the output shaft 15 in FIG. 1.

In the conventional use of the apparatus shown in FIG. 2, the apparatus would be used solely as a speed changer, between a power source and a load. One of the shafts supporting the two sets of conical wheels, for example shaft 53, would be utilized as the input or power shaft, that is driven from a source of power, and the other shaft 59 serves as a load shaft, with a speed ratio between the two shafts controlled by the setting of the two sets of conical wheels which governs the setting of the transmission belt 55 on the respective two sets of wheels. Thus, the speed ratio may be changed to step up the output speed to a speed value that is greater than the input speed, or, on the other hand, the speed ratio may be reduced so the output speed will be less than or a fraction of the input speed. That is the conventional use of the apparatus as a variable speed transmission.

This ability to vary the speed-ratio between the two sets of conical wheels is utilized in this invention, but in a different manner from that in which the speed changer is utilized in conventional practice.

When the two sets of conical wheels 52 and 58, and the transmission belt 55, are adjusted to an intermediate position, as shown in FIG. 1, with the speed ratio equal to one-to-one, it will be seen that the speeds of the two shafts 10–S$h$ and 20–S$h$ are equal and that they rotate both in the same direction. Consequently, the tendency of each of the two stators 10S and 20S will be to rotate in the opposite direction. However, since they are differentially connected through the two gears 10-G and 20-G, the two stators 10S and 20S will not rotate. In this case, the gear 20-G may be regarded as a base to which the stator 10S of the first motor 10 is anchored.

Under such conditions with the speed change mechanism 50 set at one-to-one ratio, the output shaft 15 will not rotate in either direction.

Assuming the motor speed normally of each of the two motors 10 and 20 to be 1800 revolutions per minute, rotating clockwise when viewed from the gear end, the two stator members 10S and 20S would tend both to turn counterclockwise. But as they are connected through the gears 10-G and 20-G, both stators 10S and 20S are held against rotation and there is therefore no rotational movement impressed on the output shaft 15.

It will be observed, that under such conditions, the two sets of conical wheels of the variable speed transmission 50 are rotating in the same direction at the same speed.

If now the variable speed mechanism 50 is adjusted, in the manner illustrated in FIG. 2 or in FIG. 3, so that the speed of the rotor 10R of motor 10 is 1600 revolutions per minute clockwise and the speed of the rotor 20R of motor 20 is 2000 revolutions per minute, also clockwise, the stator 10S of the motor 10 will be caused to rotate and operate in a counterclockwise direction at 200 revolutions per minute, and the stator 20S of the second motor 20 will operate also at 200 revolutions per minute but clockwise.

By changing the ratio of the speed changing mechanism 50, reversely, so that the rotor 10R of the first motor 10 is caused to rotate at 2000 revolutions per minute while the rotor 20R of the second motor is caused to rotate at 1600 revolutions per minute, the action will be such that the maintenance of the normal motor speed in the first motor 10 would cause the stator member 10S to rotate at a speed of 200 revolutions per minute clockwise while the stator member 20S will rotate at a speed of 200 revolutions per minute counterclockwise. Such reverse rotation of the two stator members will of course be compatible with the mechanical connections between them through the gears 10-G and 20-G.

Thus, by varying the speed ratio of the two shafts by means of the adjustment of the belt 55 on the speed changer 50, the speed and the direction of rotation of the output shaft 15 may be varied from a maximum speed in one direction, such as counterclockwise direction, to a maximum speed in the opposite, or clockwise, direction.

Figure 4:
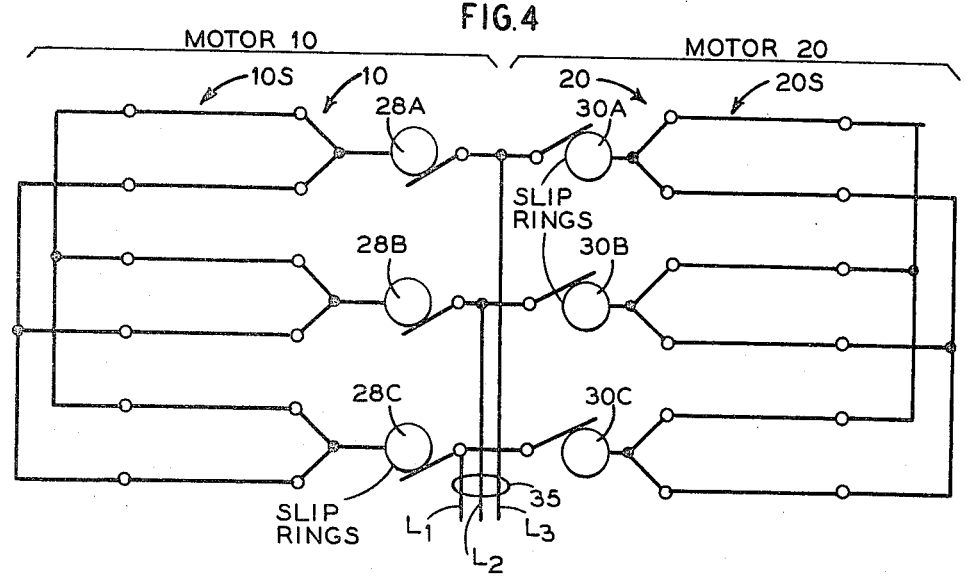
FIG. 4 is a schematic diagram showing a motor arrangement corresponding to that shown in FIG. 1, in which the distributed windings of the stators of the two motors are indicated and shown schematically connected to their related slip rings, for connection to an external circuit.

In order to relate the other modifications to that shown in FIG. 1, FIG. 4 is first applied to FIG. 1 as showing the circuit arrangement of the two stators of the motor, and the manner in which energy is supplied to the slip rings of those two stators.

As shown in FIG. 4, the two motors 10 and 20 are there indicated with two sets of stator windings in stators 10S and 20S, shown in FIG. 1, to provide appropriately distributed windings connected between respective terminals, which are here shown internally joined, but with may be brought out to the slip rings of the machine for appropriate connections to each other. Each set of distributed windings in the stator 10S is connected to one of a set of slip rings 28A, 28B, and 28C, and, similarly each set of the distributed windings of the stator 20S is connected to one of a set of slip rings 30A, 30B, 30C.

Since the two motors in FIG. 4 are simple squirrel cage motors, only the circuit connections to a stator need be shown. As shown in FIG. 4, the 2 motors are directly energized from a three phase system 35.

Figure 5:
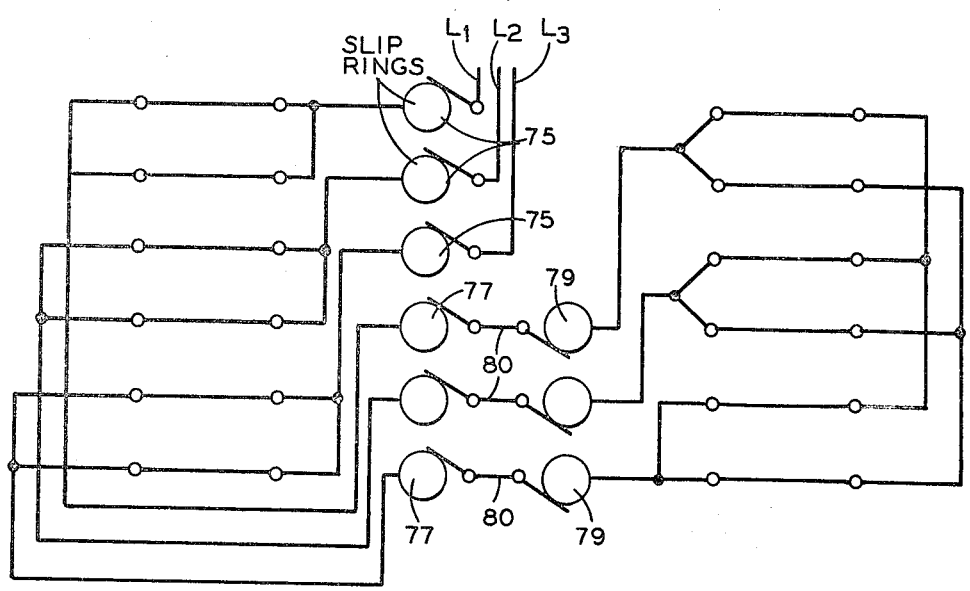
FIG. 5 is a schematic diagram, similar to that in FIG. 4 to show the distributed windings of both motors connected in series, to accommodate to a double-voltage circuit at 440 volts; and for this application the windings of one stator member are brought out at both ends, for which an extra set of slip rings are provided on that rotatable stator member.

To illustrate the flexibility of this system it may be assumed that the motors 10 and 20 of FIG. 4 are wound for 220 volts. To accommodate the motors to a 440 volt system, the two sets of distributed windings may be arranged in a series circuit arrangement as shown in FIG. 5, in which case the sets of windings of one stator are brought out to individual terminals which in this case are slip rings. Energy is supplied to the stator or motors through one set of slip rings 75, and the windings of the two stators are interconnected through their two respective sets of slip rings 77 and 79 through series circuit connections 80.

With this arrangement as shown in FIG. 5, although the windings of the two stators are electrically connected the two stator structures are capable of independent rotation as indicated in FIG. 1.

In the arrangement shown in FIG. 1 the number of turns required to adjust the hand wheel 72 to move the sheaves from minimum to maximum position is approximately 20 turns, so that in the use to which they are put in the illustrated drive as shown herein, ten turns of the hand wheel 72 serve to change the output speed from 0 revolutions per minute to 900 revolutions per minute for the largest speed range.

In order to achieve finer speed control than may be available from the speed changer alone, where such great speed control adjustment may be desired, two wound rotor motors are employed instead of the squirrel cage induction motors shown in FIG. 1.

As shown in FIG. 6 wound rotor motors 84 and 86 are provided for the system shown in FIG. 1, instead of the squirrel cage rotors illustrated in FIG. 1.

In this modification with the wound rotors an additional set of slip rings 92 is provided for the wound rotor winding of motor 84, and an additional set of slip rings 94 is supplied for the wound rotor winding of motor 86. The slip rings 28 of the stator of motor 84 and the slip rings 30 for the stator of motor 86 are connected to the supply similarly to those indicated in FIG. 4 and to those shown in FIG. 1. In the circuit arrangement shown in FIG. 6 the two sets of rotor windings 85 and 87 are directly coupled through the two sets of slip rings 92 and 94 and the series connections 95 between them, with the provision, of course, that the proper phases are connected to the series connections 95, with variably adjustable resistors 95A inserted, when desired, as in FIG. 7.

As initially indicated, the two motors could be induction type motors either squirrel cage type or wound rotor, in which a certain amount of slip would occur, or synchronous motors could be employed as in FIG. 8 to assure maintenance of a pre-set speed on the output shaft with varying loads. Those characteristics of the different types of motors would provide conditions which the designer might use or dispense with. The principles of control of the system herein disclosed are the same irrespective of the types of motor employed.

Now, the operation of the second modification may be considered, as shown in FIG. 9.

As previously indicated, the speed-changing mechanism is now coupled to the stator members of two motors 110 and 120 and the two rotor shafts are coupled by the gears.

For convenient reference, the numerals in FIG. 9 will be used to correspond to those in FIG. 1, plus 100.

Thus, the speed-changer 150 has the two conical elements 152 and 158 coupled and driven by belt 155. The pair of conical elements 152 and 152A are directly coupled to stator member 110-S, and the pair of conical elements 158 and 158-A are directly coupled to stator member 120-S. Two bearings 210 an 212 are shown to support the coupling shafts between the conical elements and the stator members 110-S and 120-S which are supported for relative free rotation.

The two rotors 110-R and 120-R are supported for free rotation with their shafts 110-S*h* and 120-S*h*. Shaft 110-S*h* has a gear 110-G secured thereto, and shaft 120-S*h* has a gear 120-G secured thereto. The two gears 110-G and 120-G are similar, same size, same number of teeth and pitch, and engaged in mesh, as shown in FIG. 9.

Appropriate shaft bearings 112-S and 122-S are indicated schematically, as are slip rings 128 for the respective stator members 110-S and 120-S of the two motors. Energy is supplied to the two motors from a suitable power system 225.

The operation of this second modification may now be considered.

When the two sets of conical wheels 152 and 158 and the transmission belt 155 are adjusted to an intermediate position, as in FIG. 9, with the speed ratio equal to one-to-one, the speeds of the two stator members 110-S and 120-S will be equal and in the same direction. The torques on the rotors 110-R and 120-R are equal and in the same direction, but the two gears 110-G and 120-G are in mesh and do not rotate. Therefore the output shaft 115, as an extension of shaft 110-Sh, remains stationary and only the stator members and the speed-changer wheels rotate.

For the purpose of this explanation, the field speeds in the stator members are considered to be 1800 rotations per minute, so the total rotations per minute of the two sets of conical wheels is 3600.

If now the speed changer is adjusted so the lower set of conical wheels will rotate at 1600 rotations per minute, with the upper set at 2000 rotations per minute, the output shaft will rotate. For convenience, an average slip of 50 rotations per minute is assumed. The upper stator field will therefore rotate 200 rotations per minute in excess of normal field speed, while the lower stator field will rotate 200 rotations per minute less than normal field speed. Allowing for the slip of 50 rotations per minute in each motor, the two rotors are rotating in opposite directions at the average of the differential field speed minus the average of the slip in both motors, or (200+200)/2 minus (50+50)/2, with each shaft 110-S and 120-S rotating at 150 rotations per minute. The output shaft 115 therefore rotates at 150 rotations per minute and receives the torque from both motors.

The invention is not limited necessarily to the type of speed change mechanism that is illustrated, nor to the disposition of the two differential gears 10-G and 20-G, shown as directly connected to the stator members of the two motors, or to the rotors in the second modification, since each of those gears may represent a gear train with the final two gears of each train meshing in the manner equivalent to that shown in FIG. 1 or FIG. 9; and the speed change mechanism may be on any other type that will permit a change in the speed ratio between the two motor shafts.

Also, the invention is not limited to connecting the output shaft to one of the stators. The shaft of one of the rotors may be connected to, or serve as, the output shaft, with the differential gears connected to the two rotors and the speed-ratio changer connected between the stators, as indicated by the two modifications.

Reference has been made to three phase systems as generic. The motors may be single or two-phase, where so desired.

The invention is not limited to the specific details as shown, but may be modified without departing from the spirit and scope of the invention as set forth in the claims.

What is claimed is:

1. An infinitely variable-speed reversible-drive system, comprising
   a first motor having a rotor member and a related stator member both supported for independent rotation;
   a second motor having a rotor member and a related stator member both supported for independent rotation;
   gearing coupling said first stator member and said second stator member;
   a shaft for said first rotor member;
   a shaft for said second rotor member;
   an output shaft coupled to one of said stator members to be driven thereby;
   and means coupled between said two rotor shafts for controlling said two rotor shafts to rotate in the same direction but at individual speeds according to a selected difference between said two individual speeds during motor operation, to thereby control the speed of said output shaft.

2. An infinitely variable-speed reversible-drive system, as in claim 1, in which
   said means coupled between said two rotor shafts includes a conical pulley connected to each of said two rotor shafts, and a coupling belt disposed and supported between the two conical pulleys for selectively varying the differential angular speed between said two conical pulleys, during motor operation.

3. An infinitely variable-speed reversible-drive system, as in claim 1, in which
   said means coupled between said two rotor shafts includes variable speed means having two variable speed shafts with means for mechanically and variably changing the speed differential between said two variable speed shafts, during motor operation.

4. An infinitely variable-speed reversible-drive system, as in claim 1, comprising
   a first motor having a rotor disposed on a rotatable shaft and having a related stator member disposed concentrically about said rotor for independent coaxial rotation relative to the axis of said shaft;
   a second motor having a rotor disposed on a rotatable shaft and having a related stator member disposed concentrically about said rotor for independent coaxial rotation about the axis of said shaft;
   means mechanically coupling the two rotor shafts to establish a desired difference in the respective speeds of the two rotor shafts during motor operation;
   and means coupling the two stator members for differ- establish a desired difference in the respective speeds of said two stator members relative to their respectively associated rotors, and for establishing an output at a speed corresponding to the difference between the two reaction speeds of said two stator members.

5. A motor drive system, infinitely-variable and reversible, as in claim 1, comprising
   a first motor having a rotor mounted on a shaft supported to be rotatable about the shaft axis, and having a stator member supported to be rotatable about said same shaft axis;
   a second motor also having a rotor mounted on a shaft supported to be rotatable about the shaft axis, and having a stator member supported to be rotatable about said same shaft axis;
   a speed-change gear mechanically connected to each rotor shaft and rotatable therewith;
   means for coupling said two speed-change gears to establish and maintain a selected speed difference between said two speed-change gears and their related shafts;
   an output shaft;
   and rotatable means for coupling said two rotatable stator members to derive a differential driving speed from said stator members during motor operation, and for imparting said differential driving speed to said output shaft.

6. The method of deriving an output speed on a load shaft, variable from zero to a maximum speed in either selected direction, from two electric motors, respectively having a rotor member supported on a rotatable shaft and a related stator member supported for independent rotation concentrically about the related rotor member, which method comprises
   the step of controlling the motors to cause the rotor members to rotate in the same relative direction;

coupling the rotatable stator members of the two motors to cause their reaction rotation forces to be differentially opposed;

applying the differential rotation force of the two stator members as an output force;

and means for varying the relative speeds of the two rotors to thereby control the corresponding reaction speeds of the two related stator members, and thereby to control and determine the differential speed from said two stator members to be utilized as an output speed.

7. A motor drive system, infinitely-variable and reversible, as in claim 1, comprising
a first motor having a rotor mounted on a shaft supported to be rotatable about the shaft axis, and having a stator member supported to be rotatable about said same shaft axis;
a second motor also having a rotor mounted on a shaft supported to be rotatable about the shaft axis, and having a stator member supported to be rotatable about said shaft axis;
a speed-change gear mechanically connected to each stator member and rotatable therewith;
means for coupling said two speed-change gears to establish and maintain a selected speed difference between said two speed-change gears and their related stator members;
an output shaft;
and rotatable means for coupling said two rotor shafts to derive a differential driving speed from said rotor shafts during motor operation, and for imparting said differential driving speed to said output shaft.

8. An infinitely variable-speed reversible-drive system, as in claim 1, in which
each stator member is provided with a set of slip rings;
each said stator member is provided with distributed phase windings having one set of terminals internally joined and having the other set of terminals brought out and connected to said set of slip rings; and
brushes for said slip rings and for connection to an external supply circuit.

9. An infinitely variable-speed reversible-drive system, in which as in claim 1,
each said stator member is provided with distributed phase windings;
one first stator member having one set of terminals of its phase windings internally connected and the other set of terminals of said windings brought out and connected to a set of slip rings;
and said other or second stator member having both sets of terminals brought out and connected to two sets of slip rings;
means connecting one set of said second two sets of slip rings to said set of slip rings of said first stator member;
and means for connecting the other set of said second two sets of slip rings to an external supply source, whereby corresponding phase windings of both stator members are energized in series relation in same phase rotation.

10. An infinitely variable-speed reversible-drive system, as in claim 1, in which
each said stator member is provided with distributed phase windings connected to an external source through respective sets of slip rings for corresponding phase rotations in both stator members;
and each said rotor member is provided with distributed phase windings, with one set of phase winding terminals internally connected and the other set of terminals brought out to slip rings;
and means electrically connecting the rotor slip rings by external circuit means for corresponding phase rotation in both rotors relative to their respective stators.

11. An infinitely variable-speed reversible-drive system, as in claim 10, in which
said means electrically connecting said rotor slip rings include variable impedance means for varying the impedance in each phase circuit including the two phases of the related rotors.

12. An infinitely variable-speed reversible-drive system, comprising
a first motor having a rotor member and a related stator member both supported for independent rotation;
a second motor having a rotor member and a related stator member both supported for independent rotation;
gearing coupling said first rotor member and said second rotor member;
a shaft for said first rotor member;
a shaft for said second rotor member;
an output shaft coupled to one of said rotor members to be driven thereby;
and means coupled between said two stator members for controlling said two stator members to rotate in the same direction but at individual speeds according to a selected difference between said two individual speeds during motor operation, to thereby control the speed of said output shaft.

13. Infinitely variable-speed reversible-drive system, as in claim 12, in which
said means coupled between said two stator members includes a conical pulley connected to each of said two stator members, and a coupling belt disposed and supported between the two conical pulleys for selectively varying the differential angular speed between said two conical pulleys, during motor operation.

14. An infinitely variable-speed reversible-drive system, as in claim 12, in which
said means coupled between said stator members includes variable speed means having two variable speed shafts with means for mechanically and variably changing the speed differential between said two variable speed shafts, during motor operation.

15. An infinitely variable-speed reversive-drive system, as in claim 12, comprising
a first motor having a rotor disposed on a rotatable shaft and having a related stator member disposed concentrically about said rotor for independent coaxial rotation relative to the axis of said shaft;
a second motor having a rotor disposed on a rotatable shaft and having a related stator member disposed concentrically about said rotor for independent coaxial rotation about the axis of said shaft;
means mechanically coupling the two stator members to establish a desired difference in the respective speeds of the two stator members during motor operation;
and means coupling the two rotors for differentially combining the two respective reaction speeds of said two rotors relative to their respectively associated stators, and for establishing an output at a speed corresponding to the difference between the two reaction speeds of said two rotors.

16. A motor drive system, infinitely-variable and reversible, as in claim 12, comprising
a first motor having a rotor mounted on a shaft supported to be rotatable about the shaft axis, and having a stator member supported to be rotatable about said same shaft axis;
a second motor also having a rotor mounted on a shaft supported to be rotatable about the shaft axis, and having a stator member supported to be rotatable about said same shaft axis;
a speed-change gear mechanically connected to each stator member and rotatable therewith;
means for coupling said two speed-change gears to establish and maintain a selected speed difference between said two speed-change gears and their related stator members;
an output shaft;
and rotatable means for coupling said two rotatable rotors to derive a differential driving speed from said rotors during motor operation, and for imparting said differential driving speed to said output shaft.

17. The method of deriving an output speed on a load shaft, variable from zero to a maximum speed in either selected direction, from two electric motors, respectively having a rotor member supported on a rotatable shaft and a related stator member supported for independent rotation concentrically about the related rotor member, which method comprises
the step of controlling the motors to cause the stator members to rotate in the same relative direction;
coupling the rotatable rotor members of the two motors to cause their reaction rotation forces to be differentially opposed;
applying the differential rotation force of the two rotor members as an output force;
and means for varying the relative speeds of the two stator members to thereby control the corresponding reaction speeds of the two related rotor members, and thereby to control and determine the differential speed from said two rotor members to be utilized as an output speed.

18. An infinitely variable-speed reversible-drive system, as in claim 12, in which
each stator member is provided with a set of slip rings;
each said stator member is provided with distributed phase windings having one set of terminals internally joined and having the other set of terminals brought out and connected to said set of slip rings; and
brushes for said slip rings and for connection to an external supply circuit.

19. An infinitely variable-speed reversible-drive system, in which as in claim 12,
each said stator member is provided with distributed phase windings;
one first stator having one set of terminals of its phase windings internally connected and the other set of terminals of said windings brought out and connected to a set of slip rings;
and said other or second stator member having both sets of terminals brought out and connected to two sets of slip rings;
means connecting one set of said second two sets of slip rings to said set of slip rings of said first stator member;
and means for connecting the other set of said second two sets of slip rings to an external supply source, whereby corresponding phase windings of both stator members are energized in series relation in same phase rotation.

References Cited
UNITED STATES PATENTS

| | | | |
|---|---|---|---|
| 899,189 | 9/1908 | Sahulka | 318—45 |
| 1,177,349 | 3/1916 | Mills | 318—45 X |
| 2,384,776 | 9/1945 | Trotimov | 318—8 X |
| 2,787,747 | 4/1957 | Drummond | 318—45 |

ORIS L. RADER, Primary Examiner

A. G. COLLINS, Assistant Examiner

U.S. Cl. X.R.

310—115; 318—45

PO-1050
(5/69)

UNITED STATES PATENT OFFICE
CERTIFICATE OF CORRECTION

Patent No. 3,539,887          Dated November 10, 1970

Inventor(s) KENNETH R. DENNICK

It is certified that error appears in the above-identified patent and that said Letters Patent are hereby corrected as shown below:

In Claim 4, Column 10, line 38, cancel "differ-";
line 39, cancel "establish a desired difference in the respective" and insert the following in place thereof --differentially combining the two respective reaction--

Signed and sealed this 20th day of April 1971.

(SEAL)
Attest:

EDWARD M. FLETCHER, JR.          WILLIAM E. SCHUYLER, JR.
Attesting Officer          Commissioner of Patents